(12) United States Patent
Flower (10) Patent No.: US 11,293,498 B2
(45) Date of Patent: Apr. 5, 2022

(54) AIRCRAFT ENGINE GENERATOR DISCONNECT DEVICE

(71) Applicant: SAFRAN ELECTRICAL & POWER, Blagnac (FR)

(72) Inventor: Paul David Flower, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 83 days.

(21) Appl. No.: 16/966,175

(22) PCT Filed: Jan. 22, 2019

(86) PCT No.: PCT/EP2019/051431
§ 371 (c)(1),
(2) Date: Jul. 30, 2020

(87) PCT Pub. No.: WO2019/149564
PCT Pub. Date: Aug. 8, 2019

(65) Prior Publication Data
US 2021/0033030 A1    Feb. 4, 2021

(30) Foreign Application Priority Data

Jan. 31, 2018  (GB) ..................................... 1801573

(51) Int. Cl.
*F16D 25/08*  (2006.01)
*F16D 11/10*  (2006.01)

(52) U.S. Cl.
CPC ............ *F16D 25/083* (2013.01); *F16D 11/10* (2013.01); *F05D 2260/4023* (2013.01)

(58) Field of Classification Search
CPC ...... F16D 25/082; F16D 25/083; F16D 11/10; F05D 2260/4023
See application file for complete search history.

(56) References Cited

U.S. PATENT DOCUMENTS

| | | |
|---|---|---|
| 4,148,384 A | 4/1979 | Stinson |
| 4,226,319 A | 10/1980 | Euler et al. |
| 4,633,993 A | 1/1987 | Limbacher et al. |
| 6,708,808 B1 | 3/2004 | Andres |
| 8,272,986 B2 | 9/2012 | Sime |
| 2002/0020601 A1 | 2/2002 | Martin et al. |

FOREIGN PATENT DOCUMENTS

| | | |
|---|---|---|
| EP | 1391621 A2 | 2/2004 |
| GB | 744943 A | 2/1956 |
| WO | 2018/026483 A1 | 2/2018 |

OTHER PUBLICATIONS

Great Britain Search Report, Application No. 1801573.5, dated Jun. 29, 2018, 5 pages.
International Search Report, PCT/EP2019/051431 dated Apr. 24, 2019, 5 pages.

*Primary Examiner* — Timothy Hannon
(74) *Attorney, Agent, or Firm* — Rankin, Hill & Clark LLP (57) ABSTRACT

The present invention relates to a generator drive disconnect device, of a generator arranged to be driven by an aircraft engine. The disconnect device comprises: a drive transfer means (1) having a first, connected configuration, and a second, disconnected configuration; a disconnect biasing means (200), configured to bias the drive transfer means to the disconnected configuration; and a fluid cavity (300), configured such that provision of a pressurised fluid in the fluid cavity biases the drive transfer means to the connected configuration.

20 Claims, 4 Drawing Sheets

AIRCRAFT ENGINE GENERATOR DISCONNECT DEVICE

The invention relates to disconnect devices for disconnecting a rotational drive of an aircraft engine from a generator driven by the engine. In particular, the invention relates to a fail-safe hydraulic disconnect device, for use in such aircraft engines.

BACKGROUND TO THE INVENTION

Aircraft engines, such as jet or turbojet engines, can comprise electrical generators which generate electricity used by the aircraft during operation. Typically, the electrical generators are driven by a drive shaft which is connected, directly or indirectly (e.g. via a gearbox), to the main turbine of the aircraft engine.

As with any mechanical system, mechanical failures can happen in the electrical generators of aircraft engines. A disconnect device which can mechanically decouple the electrical generator from the engine's turbine must therefore be provided. Even though the loss of electrical generation capacity through disconnection can be serious, if a malfunctioning generator is not disconnected from the turbine, the aircraft engine as a whole may be damaged or its performance hindered.

The majority of prior art disconnect devices used in this context provide a means by which an axial force can be applied to the drive shaft, causing the drive shaft to move axially which in turn enables a decoupling mechanism to operate. Known methods exist for providing this axial force in the prior art, each of which has its own disadvantages. These three known methods are:

1. Extracting mechanical power from the rotating drive shaft to operate a disconnect mechanism. Whilst this enables very high actuating forces and rapid disconnection, these disconnect mechanisms typically require very accurate tolerances and thus a selective assembly process and so often prove unreliable in the event of a rotor bearing failure with loss of radial location. Therefore, this method has proved to be unreliable in use;
2. Using a large actuator and a mechanical advantage generating mechanism such as a lever arm, or using an actuator to release a large and powerful spring. These methods typically have a more robust assembly process and thus prove to be more reliable in service. However, the axial force they can produce is typically limited and will not always be sufficient to guarantee disconnection. Therefore, this method cannot ensure a successful disconnect in all likely failure scenarios;
3. Using hydraulic pressure from the oil cooling system of an aircraft engine to provide the axial force required for disconnection. Whilst this solution can provide very high disconnecting forces, this method does not work in the event of a failure in the oil cooling system. Therefore, this method also cannot ensure disconnect in all likely failure scenarios.

There therefore exists a need for an improved disconnect device.

SUMMARY OF THE INVENTION

The inventors have determined that most known disconnect devices suffer from one of more of the following problems:

1. They are unable to provide a sufficiently large actuating force to guarantee disconnection in all circumstances. In some circumstances, up to 5 kN may be required, which most known disconnect devices cannot reach.
2. They require the generator shaft to be turning at a low speed or an additional layshaft to be used, in which case the power to weight ratio of the generator is reduced.
3. They may be sensitive to manufacturing tolerances, and they may have a short service life. This disadvantage is common to devices which use rotor energy to provide the disconnection force.
4. They cannot be tested without being removed from the aircraft unless the generator (and thus the engine) is turning at a minimum of idle speed. Regular testing is required to ensure that quiescent faults are not present, so a disconnect device capable of operation at zero speed would be a significant improvement.

There is an argument that the optimal known disconnect devices are those which only suffer from the first problem. However, even these known devices are not optimal given that they cannot guarantee disconnection in all circumstances. The invention has been devised to address these problems identified in the known aircraft engine generator disconnect devices.

According to a first aspect of the invention, there is provided a generator drive disconnect device, of a generator arranged to be driven by an aircraft engine, the disconnect device comprising:

a drive transfer means for transferring drive from an input shaft of the generator to a rotor of the generator, and having a first, connected configuration, and a second, disconnected configuration;

a disconnect biasing means, configured to bias the drive transfer means to the disconnected configuration;

a fluid cavity, configured such that provision of a pressurised fluid in the fluid cavity biases the drive transfer means toward, and can retain the drive transfer means in, the connected configuration.

This configuration presents a fail-safe generator drive disconnect device. In the event of a loss of pressure in the fluid cavity, the disconnect biasing means will bias the drive transfer means to a disconnected configuration, thus, in use, disconnecting the drive generator from the aircraft engine. In the event of an unplanned pressure loss in the fluid cavity (i.e. a failure situation), for example due to a leak, the generator drive disconnect device can still be disconnected by the disconnect biasing means.

The fluid cavity may be defined by a fluid casing and a moveable element, configured such that de-pressurisation of a fluid in the fluid cavity biases the moveable element from a first position to a second position. The moveable element may be configured to be slidably received in the fluid casing. The fluid cavity may be a piston and the moveable element may be a piston.

This has the advantage of providing a reliable configuration in which the fluid casing and moveable element provide a compact arrangement, in which the fluid cavity is defined.

The drive transfer means preferably comprises a separable drive transfer device, which may comprise a clutch arrangement or a separable drive shaft. The fluid cavity may be arranged around and spaced from an axis of rotation of the drive transfer means. A shaft for delivering a drive to or from the rotor of the generator may pass through a piston disposed in the fluid cavity.

The fluid cavity may be substantially annular. One or more of the moveable element and the fluid casing may be substantially annular. This has the advantage of being configured such that the disconnect device can be easily installed in use. This also has the advantage of providing a compact arrangement, in which use of space in the device is optimised.

The fluid cavity may comprise an aperture, configured such that fluid can be vented through the aperture to decrease fluid pressure in the fluid cavity.

The disconnect biasing means may comprise a spring. The spring may be a helical spring. This has the advantage of easy manufacture, compared to more complicated disconnect biasing means. This also has the advantage of providing a reliable and predictable biasing force.

The disconnect device may further comprise a fluid reservoir, and the disconnect device may be configured such that fluid can be removed from the fluid cavity into the fluid reservoir.

The disconnect device may further comprise a vent valve fluidly connected to the aperture, and configured to selectively allow or prevent fluid removal from the fluid cavity. The vent valve may be a solenoid actuated vent valve. This has the advantage of providing a device in which fluid removal from the fluid cavity can be controlled.

The disconnect device may further comprise a connection biasing means, the connection biasing means being configured to bias the drive transfer means to the connected configuration. A disconnecting force provided by the disconnect biasing means may be larger than a connecting force provided by the connection biasing means. The spring constant of the disconnect biasing means may be larger than the spring constant of the connection biasing means. The connection biasing means may be a spring. This has the advantage of providing a device which is biased to the connected configuration during normal use to help avoid an unwanted disconnect occurring. This also has the advantage of providing a device in which part of the disconnect device can be moved in the direction of the connection biasing means.

The invention further provides an aircraft engine assembly comprising a generator drive disconnect device according to the invention. The invention further provides an aircraft comprising an aircraft engine assembly comprising a generator drive disconnect device according to the invention

BRIEF DESCRIPTION OF THE DRAWINGS

By way of example only, the invention will now be described with reference to the accompanying drawings, in which.

DETAILED DESCRIPTION OF PREFERRED EMBODIMENTS

There is provided a generator drive disconnect device 1, of a generator (not shown) arranged to be driven by an aircraft engine (not shown).

Embodiments of the invention involve the use of energy stored in the form of a spring as a power source for the actuation of a disconnect mechanism. The axial force required to actuate the disconnect mechanism of the generator drive disconnect device 1 can be very large. Advantageously, the present invention can reliably provide a high level of force and therefore reliably actuate the disconnect mechanism of a generator drive disconnect device 1, even under the high torque conditions which can be found in the final stages of mechanical failure of an aircraft generator. Advantageously, the high actuation force of the spring can be provided using a relatively low activation or triggering force to release the pressurised liquid retaining the spring in its compressed state.

The generator drive disconnect device 1 can be comprised in a generator, arranged to be driven by an aircraft engine. The illustrated disconnect device 1 is suitable for disconnecting a generator from an aircraft engine, as will become apparent in light of the description of the later drawings.

The disconnect device 1 comprises a drive transfer means 100, a disconnect biasing means 200, and a fluid cavity 300.

Figure 1:
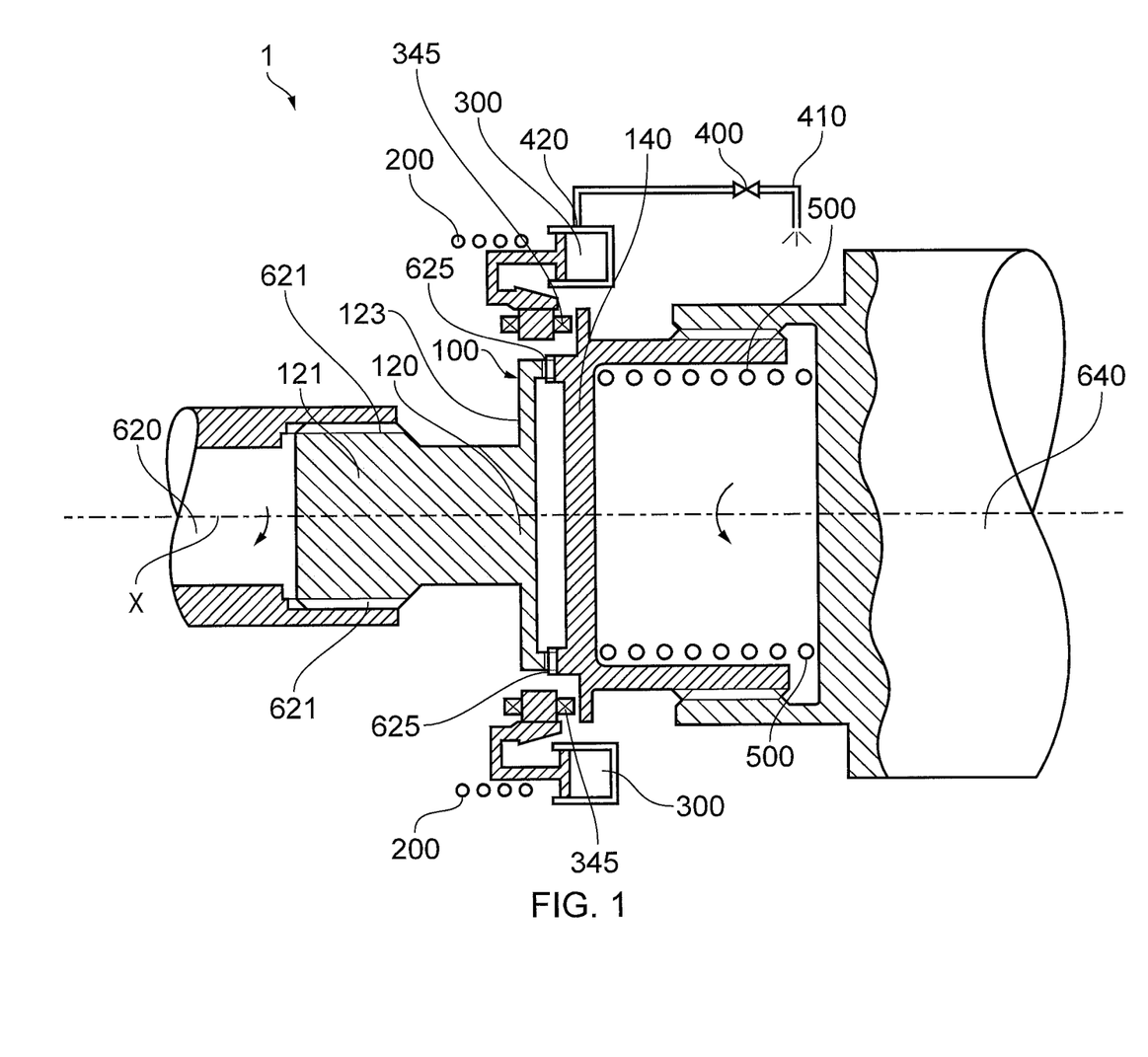
FIG. 1 shows a cross-section through an embodiment of the hydraulic disconnect device in a connected configuration.
Figure 2:
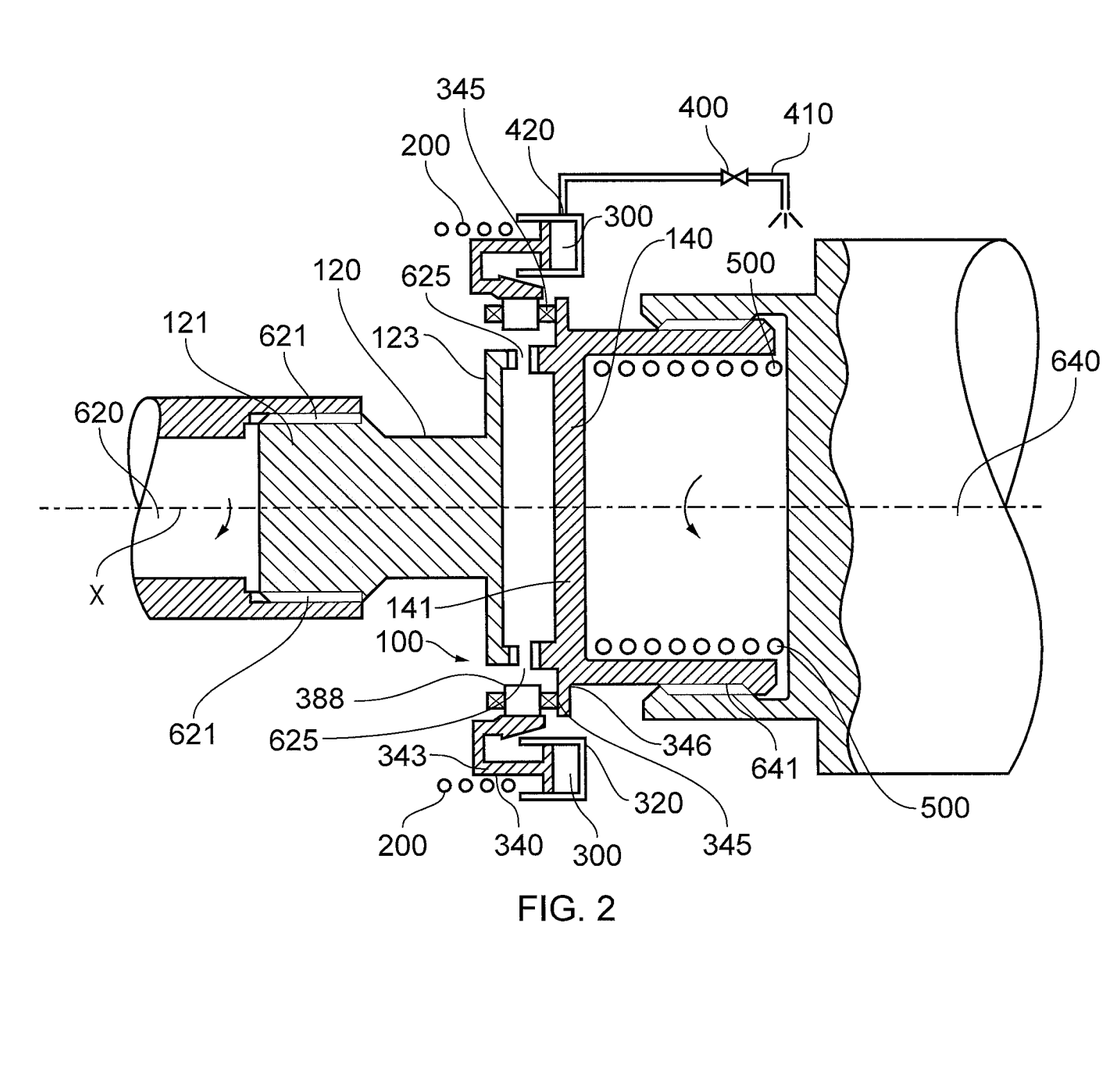
FIG. 2 shows the hydraulic disconnect device of FIG. 1 in a disconnected configuration.

The disconnect device 1 uses the disconnect biasing means 200, such as a spring, to move a moveable element 340 of the disconnect device 1, such as a piston, from a first position (as shown in FIG. 1) to a second position (as shown in FIG. 2). Movement between the first and second positions, and the effect of such movement, will be discussed in more detail below, but in general terms has the effect of moving a drive transfer means 100 (which is configured for transferring drive from an input shaft of the generator to a rotor of the generator) from a first, connected, configuration (shown in FIG. 1), to a second, disconnected configuration (shown in FIG. 2). This has the effect of disconnecting the rotor of the generator from its input shaft and/or from any other machinery connected to its input shaft.

As per the above, the drive transfer means 100 has a first, connected configuration, and a second, disconnected configuration. Any suitable connectable and disconnectable drive transfer means 100 may be used in the disconnect device 1. The drive transfer means 100 may be connectable to a drive shaft or input shaft 121 of a generator in an aircraft engine. The drive transfer means 100 may be connectable to a rotor shaft 640. The drive transfer means 100 may comprise a clutch arrangement or a separable drive shaft. Other arrangements for such a drive transfer means 100 can include a separable drive shaft including a separable connection such as a spline connection which, when driven apart axially, disconnects a drive transfer between the input shaft 121 and the rotor shaft 640 of the generator. Any device which can be disconnected by application of either a linear or radial translation of mating components can perform such a function and can be implemented in embodiments of the devices described herein.

The drive transfer means 100 may comprise an input shaft section 120 and a rotor shaft section 140. The input shaft section 120 may be configured for connection, preferably via an input shaft 121, to an engine shaft 620, connected to or comprised in the aircraft engine (not shown). Shaft 620 may be a shaft of the engine or of an intermediate gearbox between the engine and the generator. The input shaft section 120 may comprise a plate 123. The input shaft section 120 may comprise a spline attachment means 621 for connection to the engine shaft 620.

The rotor shaft section 140 may comprise a plate 141. The rotor shaft section 140 may be configured for connection to a rotor shaft 640 of the generator. The rotor shaft section 140 may comprise a spline attachment 641 for connection to a rotor shaft 640 of the generator.

When the drive transfer means 100 is in a connected configuration, the input shaft section 120 and the rotor shaft section 140 of the drive transfer means 100 are in contact with each other and can transfer a drive between the input shaft 121 and the rotor shaft 640.

Specifically, in a connected configuration, the input shaft section 120 and the rotor shaft section 140 are in contact with each other so that a force, such as a rotational force or torque, can be transferred from the input shaft section 120 to the rotor shaft section 140, or vice versa. In a disconnected configuration, the input shaft section 120 and the rotor shaft section 140 are not in contact with each other. Specifically, in a disconnected configuration, the input shaft section 120 and the rotor shaft section 140 are not in contact with each other, such that no power transmitting force, such as a rotational torque, can be transferred from the input shaft section 120 to the rotor shaft section 140.

The disconnect biasing means 200 is configured to bias the drive transfer means 100 to the disconnected configuration. The disconnect biasing means 200 may comprise a spring. The spring may be a helical spring as shown in FIGS. 1 and 2. The disconnect biasing means 200 may comprise any suitable form of biasing element, which can include any form of spring, such as a wave spring, coil spring, or a leaf spring, or a plurality of such biasing means.

The fluid cavity 300 is configured such that provision of a pressurised fluid in the fluid cavity 300 allows the drive transfer means 100 to remain in the connected configuration (as shown in FIG. 1). Specifically, provision of a pressurised fluid in the fluid cavity 300 biases the biasing means 200 to a compressed configuration, which allows the connection biasing means 500 to maintain the drive transfer means 100 in a connected configuration.

Provision of a pressurized fluid in the fluid cavity 300 therefore maintains the disconnect device 1 in a connected configuration in which the drive transfer means 100 is in a corresponding connected configuration. Release of the fluid pressure from the fluid cavity 300 can allow the disconnect device 1 to move the drive transfer means 100 to its disconnected configuration.

Figure 3:
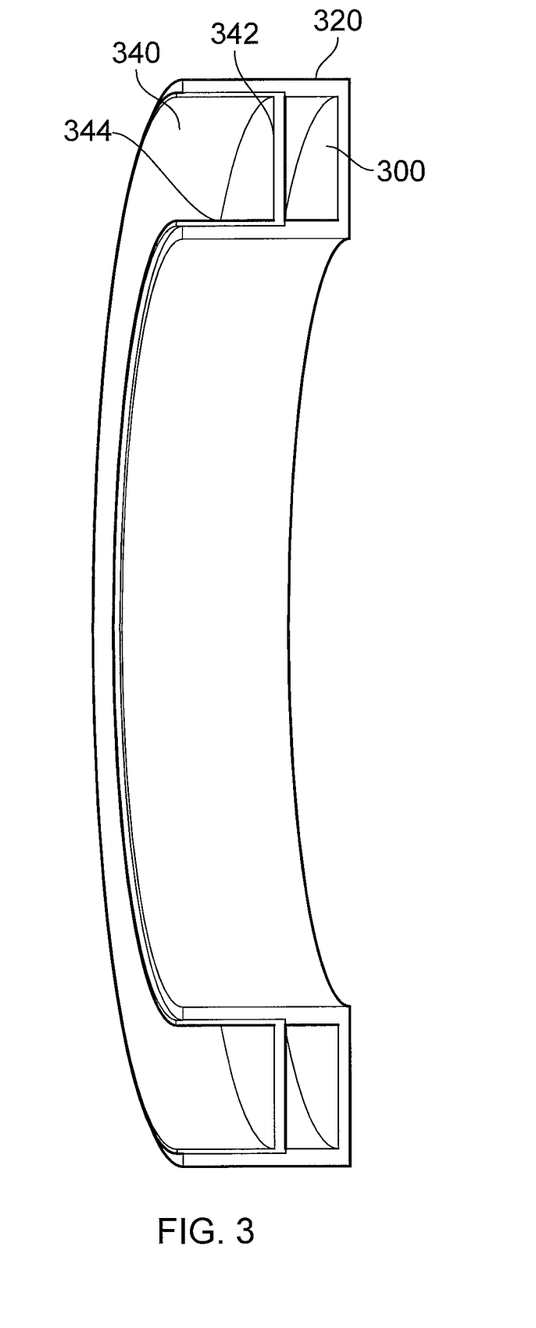
FIG. 3 shows a cross-section through an embodiment of the moveable element and fluid casing.

The fluid cavity 300 may be defined by a fluid casing 320 and a moveable element 340. The moveable element 340 may be arranged radially around and spaced from the axis of rotation X of the drive transfer means 100. This has the advantage of providing improved packaging of the overall disconnect mechanism. The engine shaft section 120 and/or the rotor shaft section 140 may therefore pass through the moveable element 340. The moveable element 340 may therefore be arranged around the shaft delivering drive to or from the rotor of the generator. The moveable element 340 is preferably substantially annular. The moveable element 340 may have a simple annular piston arrangement as shown in FIG. 3. The moveable element 340 may have a piston arrangement in which the piston comprises a piston crown 342 and a piston skirt 344, as shown in FIG. 3. The moveable element 340 may comprise a piston shaft 343. The moveable element 340 may be configured to move within the fluid casing 320. The fluid casing 320 can also be arranged around the shaft in a similar manner to the moveable element 340, in order to accommodate the moveable element 340. The fluid casing 320 may be substantially annular and may preferably receive a substantially annular moveable element 340. The moveable element 340 can move from a first position to a second position and vice versa, in a first direction, via a force applied by pressurized fluid in the fluid casing 320, and/or in a second direction via a force from the biasing means 200. The moveable element 340 may operably be connected to a mounting portion which may take the form of a shaft 343. A portion of the shaft 343 can extend away from and preferably out of the fluid casing 320. This can transfer a force associated with the movement of the moveable element 340 to provide an external actuation movement. This external actuation movement is used to move the drive transfer means 100 from the first, connected, configuration to the second, disconnected, configuration. In the specific example illustrated, the external actuation can act in a connection direction to prevent a separating force from separating the drive transfer means 100. This allows a connection biasing means 500 to retain the drive transfer means 100 in a connected configuration. When fluid pressure is released from the cavity 300, the external actuation, driven by the biasing means 200 can act to compress the connection biasing means 500 to move the drive transfer means 100 to a disconnected configuration.

Therefore, the fluid cavity 300 may be configured such that de-pressurisation of a fluid in the fluid cavity 300 allows the moveable element 340 to be driven from a first position to a second position, preferably via a biasing element 200. The moveable element 340 may be configured to be slidably received in the fluid casing. The fluid cavity 300 may comprise an aperture, configured such that fluid can be vented through the aperture 420 to decrease fluid pressure in the fluid cavity 300 on demand. As best shown in FIG. 3, the fluid cavity 300 may be substantially annular.

Figure 4:
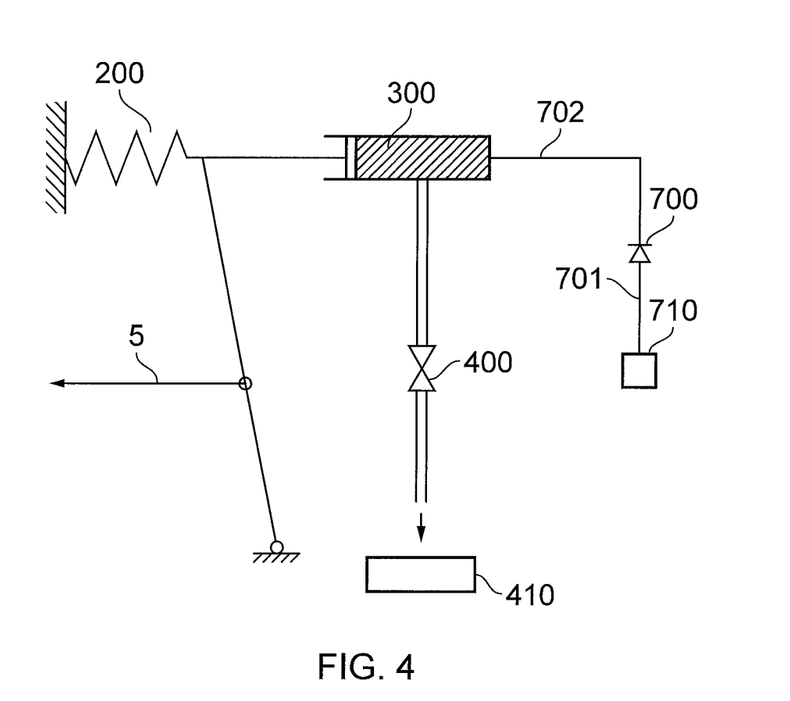
FIG. 4 shows a schematic representation of an embodiment of the hydraulic disconnect device.

A system comprising the disconnect device 1 may further comprise a pressurised fluid source 710 and a non-return valve 700, as best seen in FIG. 4. The fluid source 710 may be configured so as to provide fluid to the fluid cavity 300, via the non-return valve 700. The fluid may be communicated there between via suitably configured fluid conduits 701 and 702. Provision of fluid to the fluid cavity 300 may be controlled so that fluid is provided at a low flow rate or at a leakage flow rate. The pressurised fluid source can help to ensure that the cavity remains pressurised in spite of any leakage flow from the cavity 300. Such leakage flow may be a minimum leakage achievable from the cavity 300, or may be a design leakage flow rate, selected to provide a constant controlled flow rate through the cavity 300 when the system is in operation. The non-return valve 700 can prevent fluid from inadvertently exiting the fluid cavity 300 in the event of a failure or deactivation of the pressurised fluid source 710. The disconnect device 1 may further comprise a fluid reservoir 410. The disconnect device 1 may be configured such that fluid can be removed from the fluid cavity 300 into the fluid reservoir 410, which may be a sump.

The disconnect device 1 may further comprise a vent valve 400. The vent valve 400 may be fluidly connected to the aperture. The vent valve 400 may be configured to selectively allow or prevent fluid removal from the fluid cavity 300. The vent valve 400 may be actively controlled and/or controlled from a controller or source of a control signal which is located remotely from the vent valve. The vent valve may be actuated via an actuator local to the vent valve. Such an actuator may, for example, be a solenoid.

The disconnect device 1 may further comprise a connection biasing means 500. The connection biasing means 500 may be configured to bias the drive transfer means 100 to the connected configuration. The disconnect biasing means 200 and the connection biasing means 500 each provide a biasing force. The disconnect biasing means 200 may be configured to provide a larger biasing force than the connection biasing means 500. More specifically, the disconnect biasing means 200 can be configured to provide a larger force than the connection biasing means 500 when the disconnect device 1 is in a connected configuration. As the disconnect device 1 moves to a disconnected configuration, the force from the disconnect biasing means 200 on the moveable element 340 may decrease, for example as the biasing element becomes less compressed. As the disconnect device 1 moves to a disconnected configuration, the force from the connection biasing means 500 on the moveable element 340 may increase, for example as the biasing element is increasingly compressed. The force from the disconnect biasing means 200 on the moveable element 240 should be larger than the force from the connection biasing means 500 throughout movement of the moveable element 340 from a connected position to a disconnected position. The disconnect biasing means 200 and the connection biasing means 500 can therefore be configured such that when there is no force on the moveable element 340 from a pressurized fluid in the fluid cavity 300, the force provided by the disconnect biasing means 200 can overcome that provided by the connection biasing means 500 to move the moveable element 340 to, or sustain the moveable element 340 in, the disconnected configuration (for example as shown in FIG. 2). An equilibrium position (i.e. a resting position of the biasing means relative to each other, if only the biasing forces from the biasing means are taken into account) of the disconnect biasing means 200 and the connection biasing means 500 may therefore be beyond the disconnect position of the moveable element 340. The spring constant of the disconnect biasing means 200 may be larger than the spring constant of the connection biasing means 500. As a skilled person will appreciate, the spring constant may be calculated by measuring the extension of the disconnect biasing means (or connection biasing means) in response to a force, and dividing the force applied by the extension of the disconnect biasing means (or connection biasing means). The connection biasing means 500 may be a spring. The spring may be a helical spring. Other biasing means are available, and any suitable device or material which provides an increasing reactive force upon increased compression can be suitable in place of the illustrated biasing means.

As a skilled person may appreciate from the description above, along with the accompanying figures, the disconnect device 1 may be operated in use as follows.

The disconnect device 1 can be installed into an aircraft such that the engine shaft section 120 can transfer a torque to/from an engine shaft 620, and the rotor shaft section 140 can transfer a torque to/from a rotor shaft 640.

In a connected configuration of the disconnect device 1 (shown in FIG. 1), the engine shaft 620 can communicate a rotational torque to or from the rotor shaft 640 by means of the disconnect device 1. The engine shaft 620 and/or the rotor shaft 640 may be configured to rotate about a rotational axis X. The disconnect device 1 may also be configured to rotate about the axis X.

In a connected configuration of the disconnect device 1, the input shaft section 120 may be attached to the rotor shaft section 140 by means of an engageable drive transfer connection 625, such as a clutch interface, which can include a dog-tooth connection.

The connected configuration of the disconnect device 1 is maintained by means of fluid pressure in the fluid cavity 300. The fluid pressure in the cavity 300 acts against a counteracting force from the disconnect biasing means 200, as shown in FIG. 1. This allows the connection biasing means 500 to retain the drive transfer means 100 in a connected configuration.

When a situation arises where there is a need to remove the transfer of torque between the generator and the aircraft engine, or gearbox where present, the disconnect device 1 may be actuated to move it to a disconnected configuration (shown in FIG. 2), to disconnect the engine shaft 620 from the rotor shaft 640.

Starting from a connected configuration (shown in FIG. 1), the vent valve 400 may be actuated to an open configuration, so that fluid can flow through or past the vent valve 400 to the fluid reservoir 410. This causes fluid pressure in the fluid cavity 300 to decrease.

When the fluid pressure in the fluid cavity 300 decreases to below a threshold level, a force from the disconnect biasing means 200 may be greater than the force from fluid in the fluid cavity 300. Subsequently, the disconnect biasing means will have to overcome a cumulative force of both the fluid in the fluid cavity 300 and the force of the connection biasing means 500.

When the force from the disconnect biasing means 200 is greater than the cumulative force from the fluid in the fluid cavity 300 along with the force from the connection biasing means 500, the moveable element 340 may be caused to move to a disconnected position (to the right hand side of FIG. 1, as shown in FIG. 2). Such movement causes the moveable element 340 to transfer a force to the rotor shaft section 140 by means of a second connection 345. In the illustrated example, this second connection is provided in the form of a set of stationary bearings 388. The stationary bearings can impinge on a flange section 346 of the rotor shaft section 140 of the drive transfer means 100. The second connection 345 may be comprised in the moveable element 340. Specifically, the second connection 345 may be attached to the piston shaft 343. The shaft 343 may be coupled to a set of stationary bearings 388. The stationary bearings can be moved into contact with the plate 141 of the rotor shaft section 140 to provide an axial force to the plate 141, while the bearings allow rotation of the plate 141 relative to the moveable element 340, while still transferring the axial movement of the moveable element 340 to the plate 141. Linear movement of the non-rotating moveable element 340 can therefore cause linear movement of the shaft 343 in an axial direction, which causes the set of stationary bearings 388 to contact the plate 141. With sufficient force behind the moveable element 340, the stationary bearings can provide sufficient axial force to the plate 141 to disconnect the rotor shaft 640 from the engine shaft 620. This is done by translating the plate 141 away from the plate 123 to disconnect the drive transfer means 100.

This, in turn, causes the rotor shaft section 140 of the disconnect device 1 to be moved to a disconnected configuration. Movement of the rotor shaft section 140 to a disconnected configuration may involve translational, or sliding, movement of the rotor shaft section 140 along a spline connection, relative to the rotor shaft 640. Movement of the rotor shaft section 140 to a disconnected configuration causes disconnection of the first connection 625, as shown in FIG. 2, such that torque is not transferred between the rotor shaft section 140 and the input shaft section 120 of the drive transfer means 100.

Transition of the disconnect device 1 from a disconnected state to a connected state will now be described.

Starting from a disconnected configuration (shown in FIG. 2), the vent valve 400 may be actuated to a closed configuration, so that fluid cannot flow through or past the vent valve 400 to the fluid reservoir 410. This causes fluid pressure in the fluid cavity 300 to increase. Specifically, an increase in fluid pressure in the fluid cavity may be caused by an input of fluid from the fluid source 710 via the non-return valve 700. This may be possible by means of a piece of ground equipment such as an oil pump. An increase in fluid pressure in the fluid cavity may preferably only be caused, or may only be causable, by active human intervention.

When the fluid pressure in the fluid cavity 300 increases to above a threshold level, a force from the fluid in the fluid cavity 300 will become greater than the force from the disconnect biasing means 200.

When force from the fluid in the fluid cavity 300 is greater than the force from the disconnect biasing means 200, the moveable element 340 can be caused to move to a connected position (to the left hand side of FIG. 2, as shown in FIG. 1, and as represented by arrow 5 in FIG. 4). This causes the moveable element 340 to disconnect from the rotor shaft section 140 by means of disconnection of the second connection 345.

This, in turn, allows the rotor shaft section 140 of the disconnect device 1 to be moved to a connected configuration by means of the supplementary biasing spring 500. Movement of the rotor shaft section 140 to a connected configuration may involve translational, or sliding, movement of the rotor shaft section 140 along a spline connection, relative to the rotor shaft 640.

Although the exemplary system described above has been described using a drive transfer means which incorporates a clutch or more particularly a dog clutch as the drive transfer means, the presently described generator drive disconnect device 1 may incorporate any known drive transfer means which requires a substantially linear force to cause separation of a drive shaft of an electrical generator, or of a drive transfer means connecting such a drive shaft, to effect a disconnect of the generator.

Features of the present invention are defined in the appended claims. While particular combinations of features have been presented in the claims, it will be appreciated that other combinations, such as those provided above, may be used.

The above example describe one way of implementing the present invention. It will be appreciated that modifications of the features of the above examples are possible within the scope of the independent claims and that any and all compatible features of any embodiments described separately above, can be combined within a single embodiment of a device in accordance with the invention.

The invention claimed is:

1. A generator drive disconnect device, of a generator arranged o be driven by an aircraft engine, the disconnect device comprising:
   a drive transfer means for transferring drive from an input shaft of the generator to a rotor of the generator, and having a first, connected configuration, and a second, disconnected configuration;
   a disconnect biasing means, configured to bias the drive transfer means to the disconnected configuration;
   a connection biasing means, configured to bias the drive transfermeans to the connected configuration; and
   a fluid cavity, configured such that provision of a pressurised fluid in the fluid cavity allows the connection biasing means to bias the drive transfer means toward, and retain the drive transfer means in, the connected configuration.

2. The generator drive disconnect device of claim 1, wherein a disconnecting force provided by the disconnect biasing means is larger than a connecting force provided by the connection biasing means.

3. The generator drive disconnect device of claim 1, wherein the pressurised fluid prevents the disconnect biasing means from separating the drive transfer means.

4. The generator drive disconnect device of claim 1, wherein the drivetransfer means comprises a separable drive transfer device.

5. The generator drive disconnect device of 4, wherein the drive transfer means omprises a clutch arrangement or a separable drive shaft.

6. The generator drive disconnect device according to claim 1, wherein the fluid cavity is defined by a fluid casing and a moveable element, configured such that de-pressurisation of a fluid in the fluid cavity biases the moveable element from a first position to a second position.

7. The generator drive disconnect device of claim 6, wherein the moveable element comprises a connection configured to transfer a disconnecting force from the disconnect biasing means to the drive transfer means, and configured such that when a force from the fluid in the fluid cavity is greater than the force from the disconnect biasing means, the moveable element disconnects from the drive transfer means.

8. The generator drive disconnect device according to claim 6, wherein an equilibrium position of the disconnect biasing means and the connection biasing means is beyond a disconnect position of the moveable element.

9. The generator, drive disconnect device according to claim 6, wherein the disconnect biasing means and the connection biasing means are configured such that when there is no force on the moveable element from the pressurised fluid in the fluid cavity, the force provided by the disconnect biasing means can overcome that provided by the connection biasing means to move the moveable element to, or sustain the moveable element in, the disconnected configuration.

10. The generator drive disconnect device according to claim 6, wherein the moveable moveable element is configured to be slidably received in the fluid casing.

11. The generator drive disconnect device of claim 1, wherein the fluid cavity is arranged around and spaced from an axis of rotation of the drive transfer means.

12. The generator drive disconnect device according to claim 11, wherein the fluid cavity is substantially annular.

13. The generator drive disconnect device of claim 1, wherein a shaft for delivering a drive to or from the rotor of the generator passes through a piston disposed in the fluid cavity.

14. The generator drive disconnect device according to claim 1, wherein the fluid cavity comprises an aperture, configured such that fluid can be vented through the aperture to decrease fluid pressure in the fluid cavity.

15. The generator drive disconnect device according to claim 14, wherein the disconnect device further comprises a vent valve fluidly connected to the aperture and configured to selectively allow or prevent fluid removal from the fluid cavity.

16. The generator drive disconnect device according to claim 15, wherein the vent valve is a solenoid actuated vent valve.

17. The generator drive disconnect device according to claim 1, wherein the disconnect biasing means comprises a spring.

18. The generator drive disconnect device according to claim 1, wherein the disconnect device further comprises a fluid reservoir, and the disconnect device is configured such that fluid can be removed from the fluid cavity into the fluid reservoir.

19. An aircraft engine assembly comprising the generator drive disconnect device according to claim 1.

20. An aircraft comprising the aircraft engine assembly in accordance with claim 19.

* * * * *

UNITED STATES PATENT AND TRADEMARK OFFICE
CERTIFICATE OF CORRECTION

PATENT NO. : 11,293,498 B2
APPLICATION NO. : 16/966175
DATED : April 5, 2022
INVENTOR(S) : Paul David Flower It is certified that error appears in the above-identified patent and that said Letters Patent is hereby corrected as shown below:

In the Claims

Column 9, Claim 1, Line 46, delete "o" and insert -- to --.

Column 9, Claim 1, Line 55, delete "transfermeans" and insert -- transfer means --.

Column 10, Claim 4, Line 2, delete "drivetransfer" and insert -- drive transfer --.

Column 10, Claim 5, Line 5, delete "omprises" and insert -- comprises --.

Column 10, Claim 9, Line 25, delete ",".

Signed and Sealed this
Thirty-first Day of May, 2022

Katherine Kelly Vidal
*Director of the United States Patent and Trademark Office*